Nov. 1, 1966 A. J. FOLMAR 3,283,163

PHOTOSENSITIVE OVERLAPPED DOCUMENT DETECTOR

Filed Nov. 6, 1963

2 Sheets-Sheet 1

INVENTOR
ARTHUR J. FOLMAR

BY Donald F. Voss
ATTORNEY

United States Patent Office 3,283,163

Patented Nov. 1, 1966

3,283,163
PHOTOSENSITIVE OVERLAPPED DOCUMENT DETECTOR

Arthur J. Folmar, Rochester, Minn., assignor to International Business Machines Corporation, New York, N.Y., a corporation of New York Filed Nov. 6, 1963, Ser. No. 321,949
13 Claims. (Cl. 250—223)

This invention relates to apparatus for the detecting of the condition of overlapped documents as documents are fed from a document supply to a work station, along a predetermined document path and more particularly to a photoelectric overlapped document detector incorporating apparatus for separating the overlapped documents as the same pass relative to the detector so as to attenuate the light transmitted thereby.

Many of the more recent machines for processing documents have the facility for feeding documents varying widely in size and thickness. Because of this, it is not feasible to use a fixed throat for separating the documents as they are being fed. Hence, there is a greater tendency for documents to be fed in an overlapped condition.

Heretofore, there have been devices for detecting documents fed in the overlapped condition. In some instances, the devices took the form of mechanical apparatus such as a lever, which would be in one operable condition when there was only a single document and in another operable condition when a condition of overlapped documents occurred. Another prior art device took the form of a light source and a light sensitive device which would have an output at one level when a single document was fed and an output at another level when the documents were in an overlapped condition. However, it has been found that in many instances. these prior art devices have not been satisfactory because either the documents are so thin that the mechanical devices were either not operable by the thin documents or that they would mutilate the thin documents and the light sensitive device was not sufficiently sensitive to detect the overlapped condition due to the fact that the amount of light transmitted by a single document and the overlapped documents was substantially the same.

In the present invention, a light source and a light sensitive element are utilized to detect the overlapped document condition. However, additional apparatus is provided for constantly attempting to provide a separation between overlapped documents as the same pass relative to the light source and light sensitive device whereby the light from the light source will pass through one of the documents and then be attenuated and thereafter the attenuated light passing through the other document will be insufficient to operate the light sensitive element in the same manner as would only a single document or unseparated overlapped documents, and this different operation of the light sensitive element is detected whereby a signal is developed for indicating the overlapped document condition. Hence, even though the documents may be very thin, the overlapped document condition can still be detected.

Accordingly, a prime object of this invention is to provide an improved overlapped document detector.

Another very important object of this invention is to provide an improved overlapped document detector which can detect the overlapped document condition where the documents vary in thickness.

Still another object of the invention is to provide a detector for detecting the condition of overlapped documents which utilizes a light source and a light sensitive device for detecting the overlapped condition and includes apparatus for separating the overlapped documents as the same pass between the light source and light sensitive device whereby the light transmitted by the separated documents is attenuated.

Yet another object of the invention is to provide an overlapped document detector which is very reliable.

Still another object of the invention is to provide an overlapped document detector which is relatively inexpensive and yet which will not damage the documents.

The foregoing and other objects, features and advantages of the invention will be apparent from the following more particular description of preferred embodiments of the invention, as illustrated in the accompanying drawings.

Figure 3A:
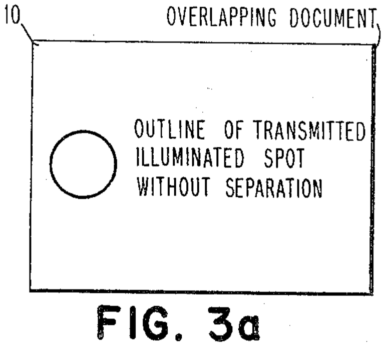
Figure 3B:
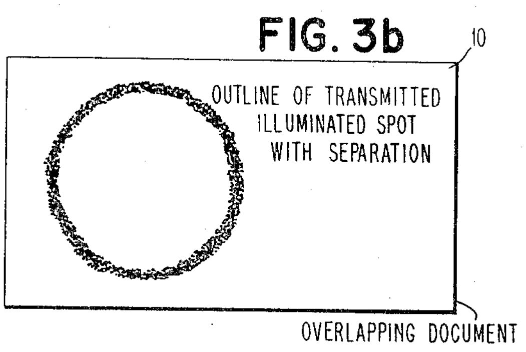
Figure 4:
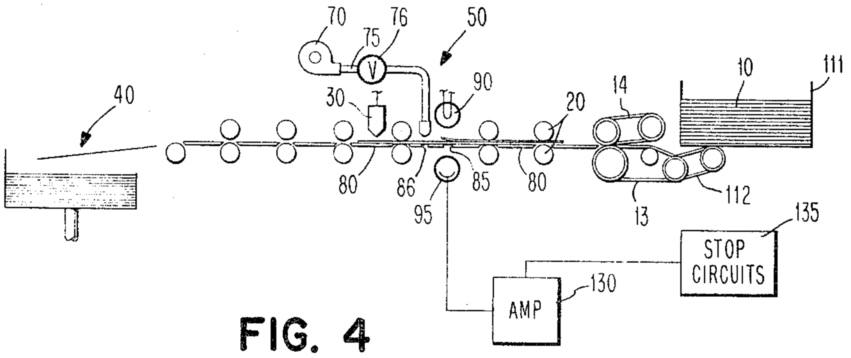
Figure 5:
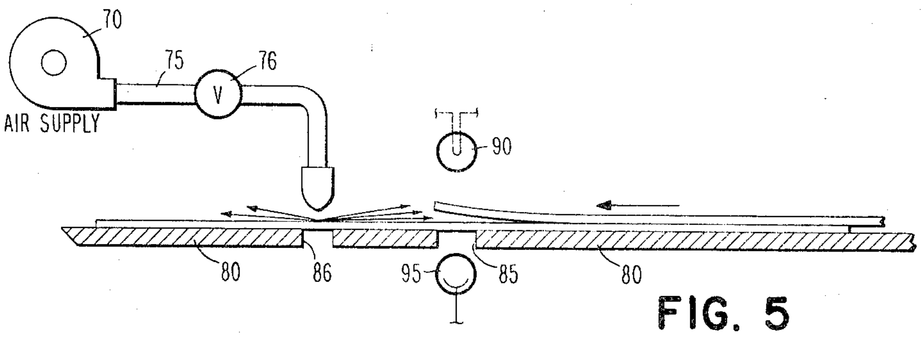
Figure 6:
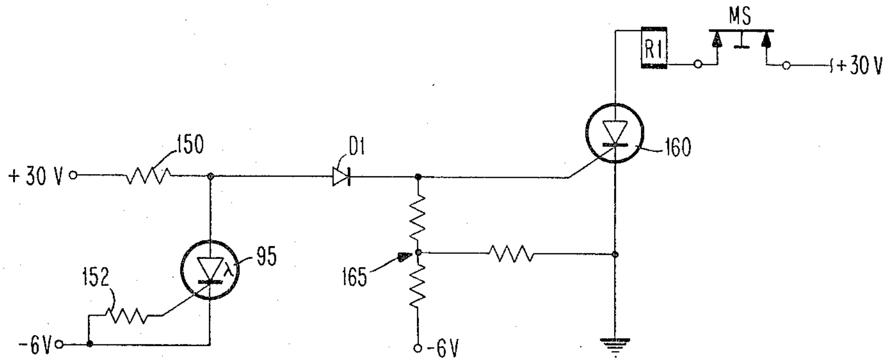

FIGS. 3*a* and 3*b* are diagrams illustrating the outline of the transmitted light spot when the documents are not separated and when they are separated respectively;

FIG. 4 is a schematic illustration of a document handling machine where the documents are fed from the bottom of a stack of documents and which incorporates the present invention;

FIG. 5 is a schematic illustration of the condition of the overlapped documents as they pass relative to the document detector when the same is incorporated into the document handling machine of FIG. 4 and, FIG. 6 is a schematic circuit diagram showing a preferred light sensitive device for the document detector together with the details of a particular utilization device connected to the output of the light sensitive device.

Figure 1:
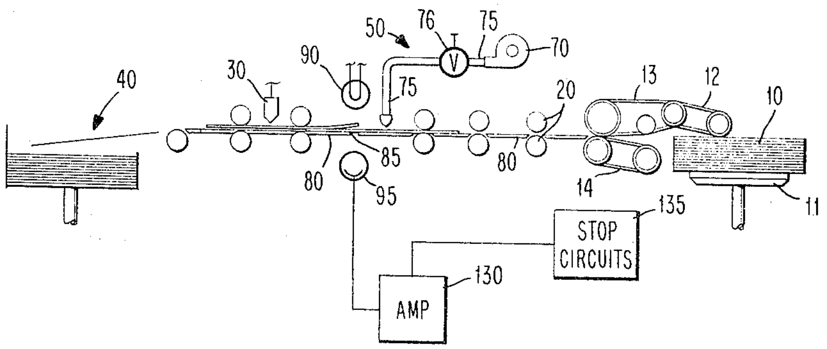
FIG. 1 is a schematic illustration of a document path in a document handling machine where the documents are fed from the top of a stack of documents and which incorporates the present invention.

With reference to the drawings, and particularly to FIG. 1, the invention is illustrative by way of example as being incorporated into a document handling machine wherein documents 10 are stacked upon a vertically movable platform 11 so as to be held in position to be fed in seriatim by means of a picker belt 12. As the documents are picked by belt 12, they pass between a feed belt 13 and a restraint belt 14. The feed belt 13 functions to advance the documents 10 forward while the restraint belt 14 functions to prevent the feeding of more than one document. However, in some instances, more than one document will be fed and thus the overlapped condition is created. The documents fed by feed belt 13 pass between a series of spaced cooperating feed rollers 20 which function to convey the documents relative to a document reading station 30. After the documents leave the document reading station 30, they are conveyed into a stacker 40.

The overlapped document detector 50 is positioned in the document feed path prior to the documents entering the read station 30. Air under pressure is directed from an air supply 70 by means of a conductor 75 which terminates at right angles to and in close proximity of a document bedplate 80. A valve 76 controls the flow of air from conductor 75 and is normally in the open position so as to permit air to flow from the conductor 75. A document bedplate 80 is provided with an aperture 85 which is longitudinally spaced a predetermined distance from the end of the conductor 75 as shown in greater detail in FIG. 2. A light source 90 is positioned above the bed plate 80 so as to be in registration with the aperture 85. A light sensitive element 95 is positioned below the bedplate 80 and in alignment with the aperture 85 whereby the light waves from light source 90 impinge upon the light sensitive device 95, in the absence of a document. Under this condition, the light sensitive device 95 is saturated with light and the output thereof will be considered at one level and in this example, it is a down level. When a document passes along the bedplate between the light source 90 and light sensitive device 95, the light waves passing through the document art sufficient to maintain the light sensitive device 95 in the saturated condition, and the output therefrom will still be at the down level. The intensity of light source 90 is adjusted whereby enough light is transmitted by the thickest documents so as to maintain the light sensitive device 95 in a saturated condition.

Figure 2:
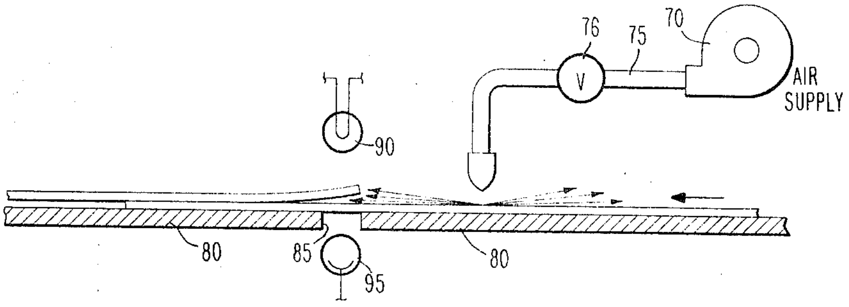
FIG. 2 is a schematic showing of the condition of the overlapped documents as they pass relative to the overlapped document detector as incorporated in the document handling machine of FIG. 1.

When more than one document passes between light source 90 and light sensitive device 95 at any one time, the upper documents are separated from the lower document which is in contact with bedplate 80 by means of the air under pressure flowing from conductor 75. This is best illustrated in FIG. 2. The air under pressure from conductor 75 will tend to urge the lower document against the bedplate 80 and separate the upper documents from the lower document. With the upper documents separated from the lower document, the transmitted light from light source 90 is attenuated and the attenuated light is insufficient to maintain the light sensitive device 95 in a saturated condition. If the documents are not separated, the transmitted light would not be attenuated and the light from lamp 90 would be sufficient, even though there is more than one document present, to maintain the light sensitive device 95 in a saturated condition. A separation takes place even when an upper document overlies the lower document in exact registration and the documtnt detector is still able to detect an overlapped condition. It should be noted that when documents are fed from the top as in this particular example, the separation takes place at the trailing edge of the top document. In the embodiment shown in FIG. 4, the conductor 75 is positioned ahead of the lamp 90 to effect the separation at the leading edge of the top document.

When documents 10 are fed from the bottom of the hopper, as in FIG. 4, the overlapped condition will be just opposite from that shown in FIG. 1, where the documents are fed from the top of a stack of documents. In FIG. 4, an aperture 86 is provided in the bedplate 80 so as to be in registration with the mouth of the conductor 75. The aperture 86 permits the air to pass through the bedplate when no documents are passing between the mouth of the conductor 75 and the bedplate 80. In FIG. 4, like elements to those of FIG. 1 have the same reference characters. Hence, documents 10 are contained in a hopper 111 and are fed therefrom in seriatim by means of a picker belt 112 to pass between feed belt 113 and restraint belt 114. As the documents 10 pass from hopper 111 and between belts 113 and 114, they enter between a pair of cooperating feedrolls 20 and thereafter are conveyed by a series of spaced cooperating feedrolls 20 relative to read station 30 and subsequently are conveyed from read station 30 to a stacker 40.

The overlapped document detector 50 is positioned between the hopper 111 and the read station 30; however, the conductor 75 is positioned upstream or ahead of the light source 90. The air issuing from conductor 75 functions to separate an overlapped document as shown in FIG. 5. The air stream enters between the upper and lower documents so as to separate the upper document from the lower document. The light passing through the upper document from light source 90 is attenuated by the separation between the documents and is insufficient to maintain the light sensitive device 95 in a saturated condition.

In FIGS. 1 and 4, a typical circuit for detecting the changes in condition of the light sensitive device 95, is shown. The light sensitive device has its output connected to amplifier 130. The output of the amplifier 130 can be connected to any indicator and in this example, it is shown as being connected to the stop circuits 135 for the machine. When the light sensitive device 95 is in a saturated condition, the output thereof will be at an up lever and under this condition, the stop circuits 135 will not be effective to stop the machine. However, when there is a condition of overlapped documents, the documents will be separated by the air issuing from conductor 75 whereby the light will be attenuated and the attenuated light will be insufficient to maintain the light sensitive device 95 in a saturated condition, and the output thereof will switch levels and in this example, it switches to an up level. With the output of the light sensitive device 95 at an up level, the stop circuits 135 will be effective to stop the machine.

It should be understood that the broad concept of the invention is to separate the documents so as to attenuate the light whereby the light sensitive device switches from a saturated condition to an unsaturated condition so as to indicate an overlapped document condition. While air has been shown as a means for separating the documents, other means for separating the documents could be used without departing from the scope of the invention. For example, a vacuum, or mechanical or electrical means can be used to separate the documents as they enter between the lamp 90 and light sensitive device 95. The size and intensity of the transmitted light spot when the overlapped documents are not separated is illustrated in FIG. 3*a*. It is seen from FIG. 3*b* that when the overlapped documents are separated, the transmitted light spot is greatly attenuated.

The light sensitive device 95 can be any suitable light sensitive device and very good results have been obtained with a diffused silicon PNPN photocell 95 shown in FIG. 6. The anode of the diffused silicon photocell 95 is connected to a positive potential through a current limiting resistor 150. The current limiting resistor 150 should have a resistance of a size so as to limit the current whereby the photocell 95 will not latch in the on or saturated condition.

The photocell 95 is provided with two gates, one which is operated by an electrical signal and the other by light. In this instance, the gate operated by an electrical signal is connected to a minus voltage through a resistor 152. With this connection, this gate is ineffective to switch the state of the photocell 95. The other gate is a light sensitive gate and is indicated by the symbol λ. When light impinges upon this gate, the photocell 95 is switched from the non-conducting state to the conducting state. The cathode of the photocell 95 is connected to a minus potential. The output of the photocell 95 is taken from the anode and is connected to the anode of a diode D1. The cathode of diode D1 is connected to the gate of a silicon controlled rectifier 160. A resistor network 165 is also connected to the gate of the silicon controlled rectifier 160 so as to bias the same negatively. The cathode of the silicon controlled rectifier 160 is connected to ground while the anode is connected to the terminal of a relay R1 which has contacts, not shown, connected in the stop circuits of the machine. The other terminal of the relay R1 is connected to a positive potential through a manually operated switch MS.

The silicon controlled rectifier 160 is normally non-conducting; however, when it is caused to conduct, it will continue to conduct until the voltage of the anode is either reduced sufficiently or interrupted, such as by the opening of manually operated switch MS. In order for the silicon controlled rectifier 160 to conduct, its gate must be rendered positive with respect to the cathode.

It is thus seen that with the photocell 95 saturated, which would be the normal condition, the diode D1 will be back-biased and the gate of the silicon controlled rectifier 160 will be negative with respect to its cathode and hence, the silicon controlled rectifier 160 will not be fired. When the overlapped document condition exists, the attenuated light will not be sufficient to maintain photocell 95 in a saturated condition and it will switch to its off state whereby the diode D1 will become forward-biased and the gate of the silicon controlled rectifier 160 will be rendered positive with respect to the cathode whereby silicon controller rectifier 160 is fired and relay R1 is energized. With the relay R1 energized, the machine will be stopped. After the overlapped condition has been remedied, the switch MS can be opened whereby the silicon controlled rectifier 160 will be extinguished.

It is seen from the foregoing that the invention provides for the detection of an overlapped document condition even though the documents are of variable thicknesses. Further, it is seen that a light source and a light sensitive device are utilized to detect the overlapped condition even though the documents transmit a substantial amount of light because means are provided to separate the documents when the same are in the region between the light source and light sensitive device whereby the light from the light source will be attenuated as it is transmitted through one document and the attenuated light will be insufficient to maintain the light sensitive device in the same condition as when there is either no document or a single document.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An overlapped document detector comprising:
a light source disposed adjacent to one side of the document path;
a light sensitive element disposed on the other side of said path and opposite said light source; and
means for vertically separating overlapped documents to introduce a space therebetween as the same come between said light source and said light sensitive element whereby the light from said light source transmitted by said vertically separated documents is attenuated and the light sensitive element responds to the attenuated light to develop a signal indicative of the overlapped document conditions.

2. An overlapped document detector comprising:
a light source disposed adjacent to one side of a predetermined document feed path;
a light sensitive device disposed on the opposite side of said feed path and in alignment with said light source; and
means for directing a stream of air so as to separate overlapped documents as they come between said light source and said light sensitive device whereby the light transmitted by said separated overlapped documents is attenuated and the light sensitive device is operative to generate a signal indicative of the overlapped condition.

3. In a document handling machine:
a bedplate disposed adjacent to the document path and provided with at least one aperture;
a light source disposed adjacent to one side of said bedplate in a position whereby the light therefrom normally passes through said aperture;
a light sensitive device disposed adjacent to the other side of said bedplate in a position to receive the light from said light source; and
a conductor for conducting air positioned to direct the air between overlapped documents to separate the same as they pass between said light source and said light sensitive device whereby the light transmitted by said separated documents is attenuated with respect to the light transmitted by a single document to switch the condition of said light sensitive device.

4. In a document handling machine an overlapped document detector comprising:
a light sensitive means;
a light source positioned at right angles to the document path to normally impinge upon said light sensitive element to saturate the same, the light source having an intensity whereby the light transmitted by the documents is sufficient to maintain said light sensitive element in the saturated state; and
means for vertically separating overlapped documents to introduce a space therebetween as said documents pass between said light sensitive device and said light source whereby the light transmitted by said overlapped documents is attenuated and causes said light sensitive element to switch to its non-saturated state.

5. The document handling machine of claim 4 wherein said separating means comprises a conductor for directing air under pressure to separate the overlapped documents.

6. The document handling machine of claim 5 where the conductor for directing air under pressure to separate the overlapped documents is positioned to separate the same toward the leading edges thereof.

7. The document handling machine of claim 5 where the conductor for directing air under pressure to separate the overlapped documents is positioned to separate the same toward the trailing edges thereof.

8. In a document handling machine:
means for feeding documents in seriatim along a predetermined document path;
a light sensitive device positioned adjacent to one side of said document path;
a light source positioned adjacent to the other side of said document path so that light is directed to impinge upon said light sensitive device, the intensity of said light source being sufficient to render said light sensitive device in a saturated state both during the presence and absence of documents between said light source and said light sensitive device; and
means for vertically separating overlapping documents to introduce a space therebetween as the same pass between said light source and said light sensitive device whereby the light transmitted by said separated documents is attenuated and causes said light sensitive device to switch to its non-saturated state.

9. The document handling machine of claim 8 wherein said separating means comprises:
a conductor positioned adjacent to said other side of said document path and spaced from said light source for directing air under pressure to come between overlapped documents so as to separate the same.

10. The document handling machine of claim 9 wherein said conductor is positioned downstream of said light source with regard to the feeding direction of documents in said document path.

11. The document handling machine of claim 9 wherein said conductor is positioned upstream of said light source with regard to the feeding direction of the documents in said document path.

12. In a document handling machine:
a hopper for containing documents;
means for feeding documents from the top of said hopper in seriatim along a predetermined document path;
a light sensitive device positioned adjacent to one side of said document path;
a light source positioned adjacent to the other side of said document path so that light is directed upon said light sensitve device, the intensity of said light source being sufficient to render said light sensitive device in a saturated state both during the presence and absence of documents passing between said light source and said light sensitive device;
means for vertically separating overlapped documents to introduce a space therebetween as said documents pass between said light source and said light sensitive device whereby the light transmitted by said separated documents is attenuated and causes said light sensitive device to switch to its non-saturated state; and means operable upon said light sensitive device switching to said non-saturated state for stopping the operation of said feeding means.

13. In a document handling machine:

a hopper for containing documents;

means for feeding documents from the bottom of said hopper in seriatim along a predetermined document path;

a light sensitive device positioned adjacent to one side of said document path;

a light source positioned adjacent to the other side of said document path so that light is directed onto said light sensitive element, the intensity of said light source being sufficient to render said light sensitive device in a saturated state both during the presence and absence of documents passing between said light source and said light sensitive device;

means for vertically separating overlapped documents to introduce a space therebetween as said documents pass between said light source and said light sensitive device whereby the light transmitted by said overlapped documents is attenuated and causes said light sensitive device to switch to its non-saturated state; and means for detecting that said light sensitive device has switched to its non-saturated state.

References Cited by the Examiner

UNITED STATES PATENTS

| | | | |
|---|---|---|---|
| 1,649,448 | 11/1927 | Cutler | 84—519 X |
| 2,994,528 | 8/1961 | Hull et al. | 271—56 |
| 3,072,797 | 1/1963 | Vacchelli | 250-223 |
| 3,219,829 | 11/1965 | Reist | 250—223 |

RALPH G. NILSON, *Primary Examiner.*

WALTER STOLWEIN, *Examiner.*